US007907579B2

(12) United States Patent
FitzGerald

(10) Patent No.: US 7,907,579 B2
(45) Date of Patent: Mar. 15, 2011

(54) WIFI GEOLOCATION FROM CARRIER-MANAGED SYSTEM GEOLOCATION OF A DUAL MODE DEVICE

(75) Inventor: Cary FitzGerald, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 307 days.

(21) Appl. No.: 11/504,920

(22) Filed: Aug. 15, 2006

(65) Prior Publication Data

US 2008/0045233 A1      Feb. 21, 2008

(51) Int. Cl.
*H04W 4/00*        (2009.01)
(52) U.S. Cl. .............. 370/338; 370/328; 455/456.1; 342/126; 342/450
(58) Field of Classification Search .......... 370/338, 370/328; 455/456.1; 342/126, 450
See application file for complete search history.

(56) References Cited

U.S. PATENT DOCUMENTS

| | | | |
|---|---|---|---|
| 6,252,867 B1 * | 6/2001 | Pfeil et al. | 370/335 |
| 6,308,072 B1 * | 10/2001 | Labedz et al. | 455/448 |
| 7,119,687 B2 * | 10/2006 | Paulsen et al. | 340/572.1 |
| 7,254,405 B2 * | 8/2007 | Lin et al. | 455/456.1 |
| 7,272,385 B2 * | 9/2007 | Mirouze et al. | 455/414.1 |
| 7,657,239 B2 * | 2/2010 | Doradla et al. | 455/161.1 |
| 2005/0169228 A1 * | 8/2005 | Dowling | 370/342 |

* cited by examiner

*Primary Examiner* — Nghi H Ly
(74) *Attorney, Agent, or Firm* — Haynes and Boone, LLP.

(57) ABSTRACT

In one embodiment, a carrier-managed system such as the cellular network or the Global Positioning System (GPS), is leveraged to directly determine or triangulate geographic locations of the dual mode device and then the access point. Advantageously, a service provider may constantly and automatically update its database with the geolocation of APs and associated devices to thereby provide accurate information and improved emergency services.

21 Claims, 4 Drawing Sheets

WIFI GEOLOCATION FROM CARRIER-MANAGED SYSTEM GEOLOCATION OF A DUAL MODE DEVICE

TECHNICAL FIELD

The present invention relates generally to wireless devices and, more particularly, to a system and method for providing geographic location information on customer premises equipment (CPE).

BACKGROUND

Dual mode devices (DMDs), such as dual mode handsets, PDAs, laptops, and other mobile wireless devices, have a cellular radio transceiver for access to a carrier's radio access network (RAN) and a wireless fidelity (WiFi) radio transceiver for access to a wireless local area network (LAN). These dual mode devices can advantageously utilize WiFi networks when available and fill in gaps between WiFi networks using a carrier-managed network, such as the cellular network.

There are many reasons why the WiFi network may be preferable to the user and the carrier. The WiFi network may be free to the carrier and would reduce the cost associated with setting up a call for a dual mode device because the access point (AP) operator and service provider (SP) providing bandwidth may be different parties. The carrier may also provide improved convenience to the subscriber by only requiring the use of one phone while also extending wireless coverage to the subscriber's home, where the carrier-managed system may not reach or may not reach well. Furthermore, the carrier may lower transmission costs by using the Internet to move voice traffic to the carrier's network, thereby using less time on the carrier's network and increasing revenue. The dual mode device may also gain access to additional features when in a WiFi LAN.

A problem with Voice over Internet Protocol (VoIP) services is that the service provider does not have reliable geographic location data on the CPE, such as access points. Even when a subscriber has registered with the system, the service provider cannot be certain that the subscriber has not physically moved the CPE without notifying the service provider. Network and AP information may change on a regular basis as new hotspots are created, existing hotspots are turned off, and roaming agreements are created/concluded. A dangerous impact of incorrect or inaccurate geolocation information is that emergency services may be sent to incorrect locations.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DESCRIPTION OF EXAMPLE EMBODIMENTS

The present invention provides an apparatus and method for determining the geographic location (or "geolocation") of an access point using a dual mode device. In one embodiment, a carrier-managed system such as the cellular network, is leveraged to directly determine or triangulate geographic locations of the dual mode device and then the access point. Advantageously, the present invention allows for improved service for mobile wireless devices, in particular providing accurate locations for emergency services.

A dual mode device (DMD) as used in this document refers to handsets, PDAs, laptops, and other mobile wireless devices, that have a transceiver for access to a carrier-managed system (e.g., a cellular radio transceiver for access to a carrier's radio access network (RAN)) and a wireless local area network (LAN) radio transceiver (e.g., wireless fidelity (WiFi), Bluetooth, ultra wideband (UWB) radio, etc.) for access to a public or private IP network (e.g., a wireless LAN or the Internet).

An access point (AP) may be any device that allows wireless-equipped computers and other devices to communicate with a wired network. An AP may also be used to expand the range of a wireless network. In one example, an AP is able to support WiFi in general, and the 802.11a, 802.11b, and/or 802.11g wireless networking standards in particular. Examples of applicable APs for the present invention include but are not limited to the Wireless-B Access Point (Model WAP11), Wireless-G Access Point (Model WAP54G), and Dual-Band Wireless A+G Access Point (Model WAP55AG), available from Linksys, a division of Cisco Systems, Inc., of San Jose, Calif.

A hotspot may be a location with a high-speed Internet connection and wireless connectivity provided by one or more active wireless APs. A hotspot may be public or private.

The term "carrier-managed" system or network as used in this document refers to a system with a fixed and known infrastructure managed by a carrier, in one example including RAN, CDMA, GSM, TDMA, WiMax, 3G, 4G, or a network other than wireless LAN technology such as WiFi or Bluetooth. A carrier-managed system may also include the Global Positioning System in one embodiment of the present invention.

The term "subscriber-managed network" as used in this document refers to a portable network and associated devices managed by a subscriber (such as a DMD and an AP) supported by Bluetooth, ultra wideband (UWB), or wireless LAN technology, such as the 802.11 network (i.e., networks utilizing the 802.11a, 802.11b, and/or 802.11g wireless networking standards or WiFi).

Figure 1:
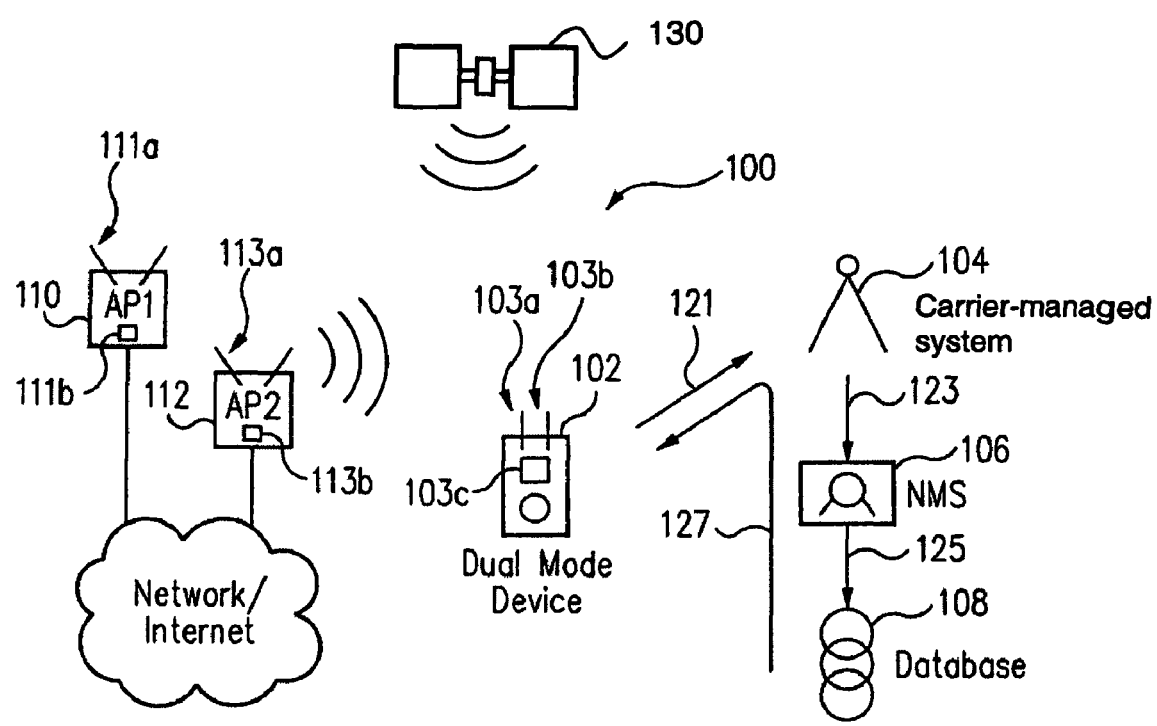
FIG. 1 illustrates an example system for mapping access points.

Referring now to FIG. 1, an example system for mapping access points is illustrated. An AP mapping system 100 is illustrated in a particular embodiment. System 100 includes a DMD 102 (e.g., dual mode handsets, PDAs, laptops, or other mobile wireless device), a carrier-managed system tower 104 (e.g., RAN, CDMA, GSM, TDMA, WiMax, 3G, 4G, or an applicable network other than WiFi, such as GPS), a network management system (NMS) 106, a database 108, access points (APs) 110 and 112, and GPS satellites 130.

In a particular embodiment, DMD 102 includes a first transceiver/antenna 103a and a second transceiver/antenna 103b, one of which may be used to communicate with the carrier-managed system while the other may be used to communicate with an access point. DMD 102 further includes a processor 103c operably coupled to transceivers 103a and 103b for processing data, in particular geographic location data for the DMD and the access point.

In a particular embodiment, APs 110 and 112 include a transceiver 111a and 113a, respectively, and a processor 111b and 113b, respectively. The processor is configured to allow a wireless device (e.g., a DMD) access to a public or private IP network connected to the access point (e.g., via a 10/100 Ethernet RJ-45 port) after receiving access information from the wireless device.

Figure 2:
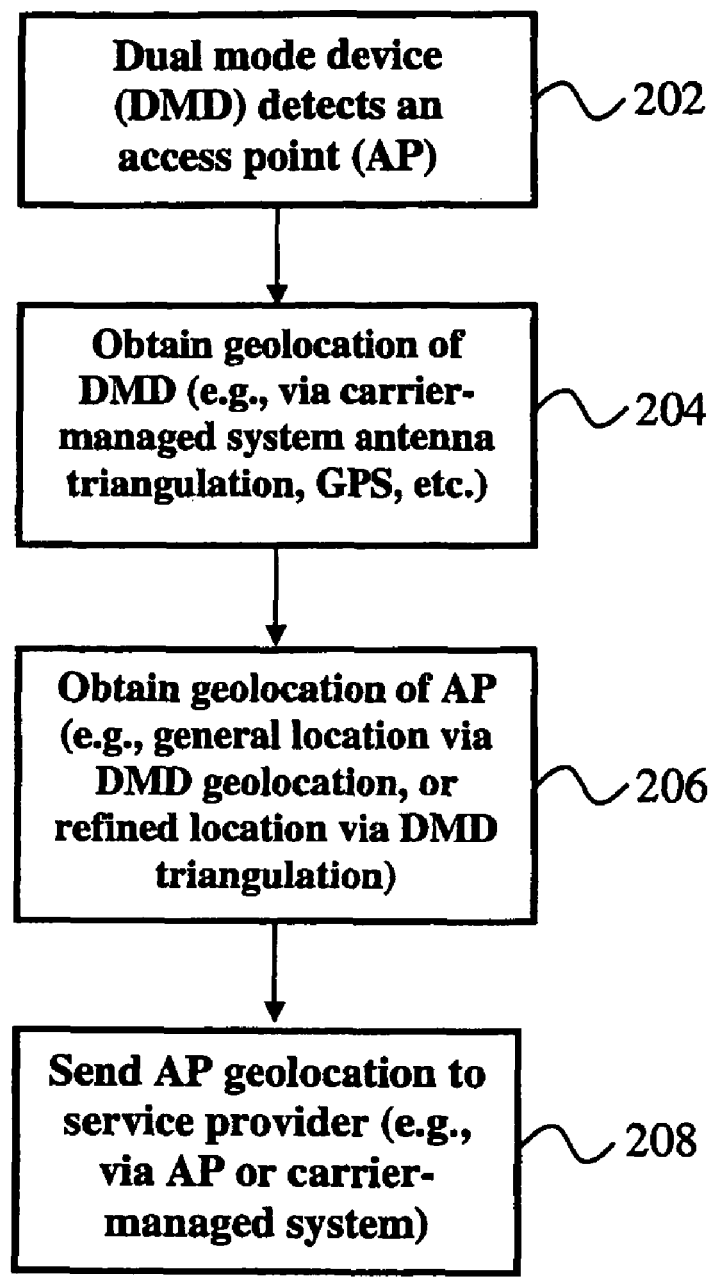
FIG. 2 illustrates an example method for mapping access points.

Referring now to FIG. 2 in conjunction with FIG. 1, an example method for mapping access points is illustrated. A flowchart of a method of determining the geographic location of an access point using a dual mode device is illustrated in a particular embodiment.

At step 202, DMD 102 detects an access point (e.g., AP 110 or 112) or is otherwise notified in range of a wireless access point.

At step 204, the geolocation of DMD 102 is approximated via the carrier-managed system in one embodiment. In one example, the carrier-managed system may correlate geolocation information of the DMD at the time of standard roaming/handoff procedures with the name of the AP that the subscriber was being handed off to. Advantageously in this example, participation from the DMD would not be required. In another example, carrier-managed system tower triangulation based on signal strength of illuminated cellular towers, and/or other similar means and methods may be used. For carrier-managed system antenna triangulation, DMD 102 contacts and registers with a carrier-managed system via carrier-managed system tower 104 (arrow 121 of FIG. 1). The carrier-managed system then connects DMD 102 to the carrier's NMS 106 (arrow 123 of FIG. 1), which authenticates DMD 102 and then queries the carrier's database 108 for tower 104 geolocation (arrow 125 of FIG. 1). The tower geolocation may then be sent to DMD 102 (arrow 127 of FIG. 1). The tower geolocation and radio signal strength, in addition to another tower geolocation and radio signal strength, may then be used to triangulate the geolocation of DMD 102. A greater number of tower geolocations and signal strength data will increase the accuracy of the triangulated geolocation of the DMD. In yet another example, the geolocation of DMD 102 may be approximated via GPS. DMD 102 may have GPS functionality (either directly with a GPS receiver or via assisted GPS from the carrier-managed system).

At step 206, the geolocation of the access point is obtained using the geolocation of DMD 102. In one embodiment, the general geolocation of the access point may be obtained via a first estimate using the DMD geolocation. If the DMD geolocation is provided by carrier-managed system tower, the range of a first estimate would be a radius of the tower signal coverage area, in one example having a radius of about 5 km. A service provider may not be interested in precise geolocation, and may be interested on a macro-level when the subscriber moves across a city or across the country. Absence of useful geolocation information where the data previously had been may be a signal that the subscriber has moved. In any case, once notified of a substantial change in geolocation from a geolocation previously recorded by the service provider, the service provider may contact the subscriber to update the location in the service provider's database. In another embodiment, a refined geolocation of the access point may be obtained via DMD triangulation, which is described in greater detail below with respect to FIGS. 3 and 4. In yet another embodiment, a refined geolocation of the access point may be obtained via GPS data and software from a receiver on the DMD.

At step 208 the AP geolocation may be sent to a service provider, for example a telecommunications carrier, via the AP or carrier-managed system network. The AP geolocation and/or the DMD geolocation, may be relayed to the service provider via a handoff/registration process, as part of a new process specific to geolocation, at power up of the device, at a specific time interval, or at a triggered event (e.g., user pressed key, WiFi network sensed, DMD changed location, new software load, etc.). Advantageously, the geolocations of APs, hotspots, and other CPE may be updated with service providers to enhance service, particularly for the case of providing emergency services. The determined geolocation of the AP may be attributed to devices and networks associated with the AP in one embodiment, thereby providing a geolocation for entire network equipment using DMD geolocation data that might not otherwise have had geolocation capability. In one example, non-WiFi endpoints that are associated with the AP may be attributed the AP's determined geolocation.

Figure 3:
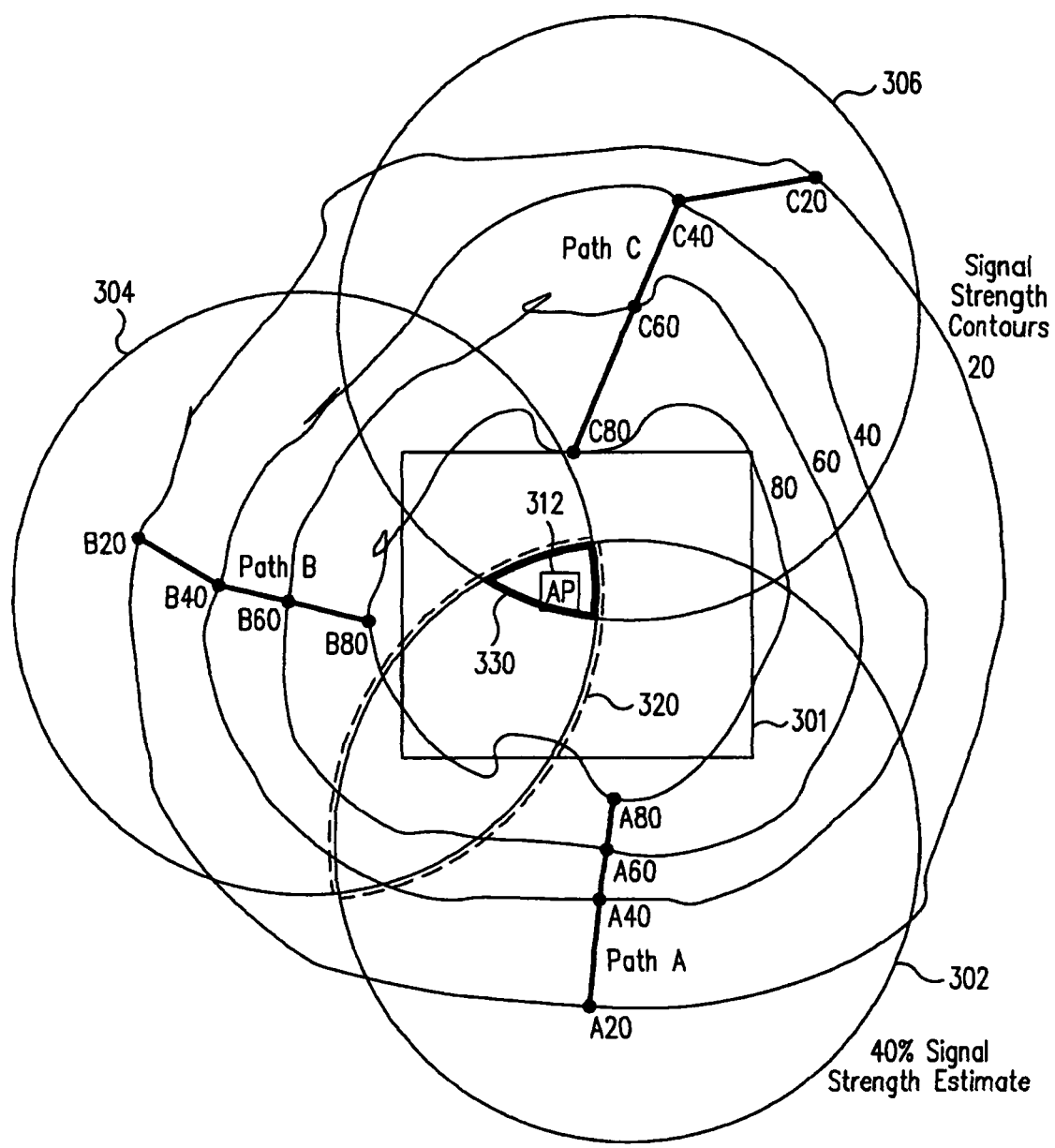
FIG. 3 illustrates another example method for mapping access points.
Figure 4:
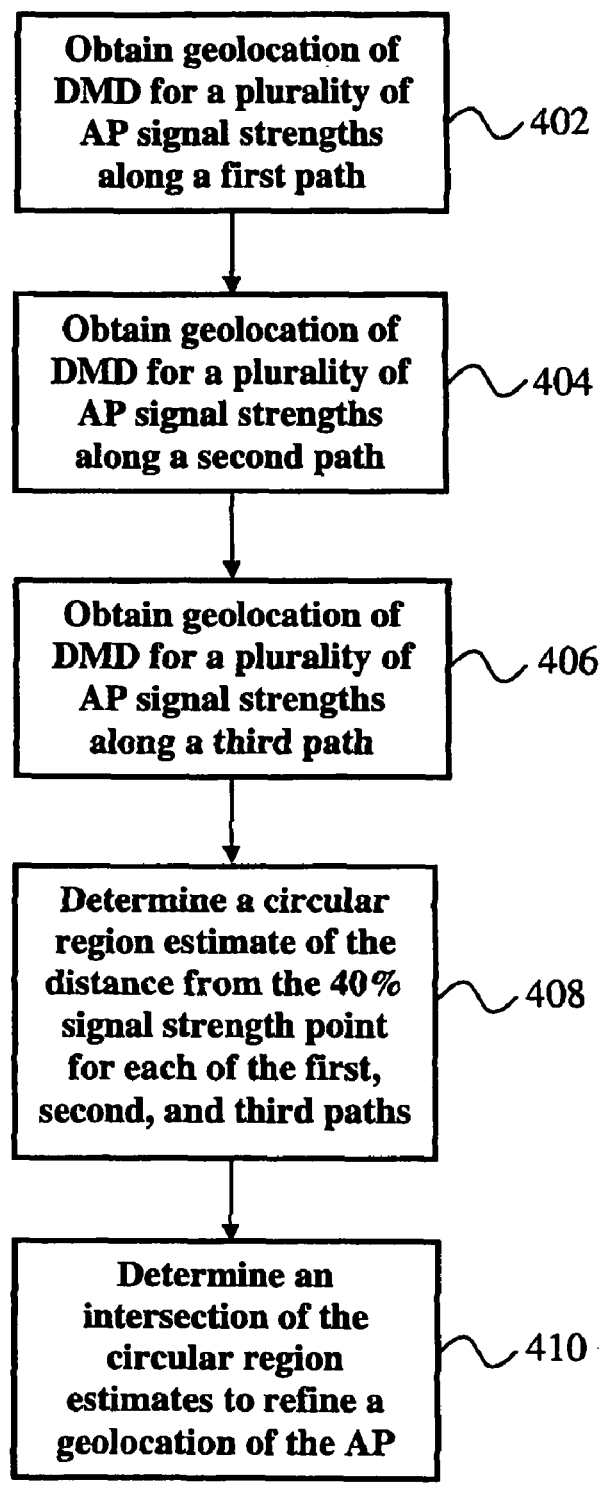
FIG. 4 illustrates another example method for mapping access points.

Referring now to FIGS. 3 and 4 in conjunction with FIG. 1, another example method for mapping access points is illustrated. An illustration and a flowchart are shown, respectively, of a method for mapping an access point 312 within a home/business 301 hosting access point 312, in a particular embodiment of the present invention. Contour lines around home/business 301 represent the signal strength as measured by the DMD (e.g., DMD 102). Paths A, B, and C are the physical paths that a subscriber, carrying the DMD, takes to and from home/business 301. Circles 302, 304, and 306 are estimates of the distance from the 40% signal strength point on the path to the AP. It is noted that at lower signal strengths, the confidence in the estimate will be lower, while at higher signal strengths, the confidence will be higher.

At step 402, the geolocation of DMD 102 (FIG. 1) for a plurality of AP signal strengths (e.g., A20-A80) along a first path (e.g., path A) is obtained. The geolocation of DMD 102 may be estimated as described above, for example via carrier-managed system antenna triangulation, GPS, and/or other similar means and methods.

At step 404, the geolocation of DMD 102 (FIG. 1) for a plurality of AP signal strengths (e.g., B20-B80) along a second path (e.g., path B) is obtained. The geolocation of DMD 102 may be estimated as described above, for example via carrier-managed system antenna triangulation, GPS, and/or other similar means and methods.

At step 406, the geolocation of DMD 102 (FIG. 1) for a plurality of AP signal strengths (e.g., C20-C80) along a third path (e.g., path C) is obtained. The geolocation of DMD 102 may be estimated as described above, for example via carrier-managed system antenna triangulation, GPS, and/or other similar means and methods.

At step 408, a circular region estimate of the distance from the 40% signal strength point for each of the first, second, and third paths (circular regions estimates 302, 304, and 306, respectively) are determined. It is noted that the respective circular region estimate may be performed immediately after obtaining geolocation data for the plurality of AP signal strengths along a respective path.

At step 410, an intersection of the circular region estimates are then determined to refine the geolocation of AP 312. An intersection 320 between estimates 302 and 304 is shown by dashed lines. An intersection 330 between estimates 302, 304, and 306 is shown by thicker lines. It should be noted that a greater number of DMD geolocations and signal strength data along a greater number of paths will increase the accuracy of the triangulated geolocation of the access point.

In another particular embodiment, instead of using the subscriber's DMD in the method described above for mapping an access point, the carrier itself may survey subscriber AP geolocations, either systematically surveying a notified location periodically, or in an ad-hoc fashion by using carrier service trucks that traverse the covered area. The carrier may use a survey apparatus that detects AP signals and signal strengths, and provides geolocation data, either via antenna triangulation or GPS. The survey apparatus may trigger an alert when geolocation mismatches from those in the carrier database are found. The carrier could then update their database and/or send a notification to the subscriber requesting an update of their information with the carrier.

Advantageously, the present invention allows a service provider to constantly and automatically update its database with the geolocation of APs and associated devices. In other words, the carrier's hotspot map can be dynamically updated by the devices on the network. The carrier's cellular dual mode user base of thousands or millions of users may constantly and accurately (automatically) update the network database for APs/hotspots in a given territory. As hotspots go up or down, the DMDs will be capable of reporting back to the carrier and the AP/hotspot map will be up-to-date and accurate. As users find hotspots, hotspot operators may also work with the carriers to provide accurate information and improved emergency services.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A dual mode apparatus, comprising:
   a first transceiver configured to receive geographic location data of the dual mode apparatus from a carrier-managed system;
   a second transceiver for communicating with an access point supporting a wireless local area network (LAN); and
   a processor configured to:
      process geographic location data of the dual mode apparatus and access point signal strength at a plurality of locations along a plurality of different paths,
      determine a circular region estimate for each of the plurality of different paths, the circular region estimate based on access point signal strength,
      determine an intersection of the circular region estimates to triangulate a geographic location of the access point, and
      provide triangulated geographic location data of the access point to a service provider.

2. The apparatus of claim 1, wherein the carrier-managed system is selected from the group consisting of a radio access network (RAN), CDMA, GSM, TDMA, WiMax, 3G, and 4G.

3. The apparatus of claim 1, wherein the first transceiver receives geographic location data of the dual mode apparatus via the Global Positioning System (GPS).

4. The apparatus of claim 1, wherein the first transceiver is capable of transmitting a signal querying the carrier-managed system for geographic location data of a carrier-managed system antenna from which the dual mode apparatus is receiving a signal.

5. The apparatus of claim 1, wherein the first transceiver is capable of transmitting data to the carrier-managed system to update a database with geographic location data of the access point.

6. The apparatus of claim 1, wherein the access point supports a wireless networking standard selected from the group consisting of 802.11a, 802.11b, and 802.11g.

7. The apparatus of claim 1, wherein the access point supports a networking standard selected from the group consisting of wireless fidelity (WiFi), Bluetooth, and ultra wideband (UWB).

8. The apparatus of claim 1, wherein the wireless LAN allows for connectivity to the Internet.

9. The apparatus of claim 1, wherein the second transceiver is capable of detecting signals of different strengths from the access point.

10. A dual mode apparatus, comprising:
    means for receiving geographic location data of the dual mode apparatus from a carrier-managed system;
    means for communicating with an access point supporting a wireless local area network (LAN);
    means for processing signal strength data from the access point and geographic location data of the dual mode apparatus at a plurality of locations along a plurality of different paths;
    means for determining a circular region estimate for each of the plurality of different paths, the circular region estimate based on access point signal strength;
    means for determining an intersection of the circular region estimates to triangulate a geographic location of the access point; and
    means for providing triangulated geographic location data of the access point to a service provider.

11. A method comprising:
    detecting an access point supporting a wireless local area network (LAN) with a dual mode device;
    receiving geographic location data of the dual mode device from a carrier-managed system;
    processing geographic location data of the dual mode apparatus and access point signal strength at a plurality of locations along a plurality of different paths;
    determining a circular region estimate for each of the plurality of different paths, the circular region estimate based on access point signal strength;
    determining an intersection of the circular region estimates to triangulate a geographic location of the access point; and
    providing triangulated geographic location data of the access point to a service provider.

12. The method of claim 11, wherein the geographic location data of the dual mode device is determined via the Global Positioning System (GPS).

13. The method of claim 11, wherein the geographic location data of the dual mode device is determined via triangulation of carrier-managed system antennae.

14. The method of claim 11, wherein the geographic location data of the access point is determined by triangulating access point signal strength along three pathways using the dual mode device.

15. The method of claim 11, further comprising transmitting the geographic location data of the access point to a service provider via the carrier-managed system to update a database with information about the access point.

16. The method of claim 11, further comprising detecting devices associated with the access point and attributing the geographic location data of the access point to the associated devices.

17. A method comprising:
    detecting an access point supporting a wireless local area network (LAN) with a dual mode device;
    obtaining geographic location data of the dual mode device for a plurality of access point signal strengths along a first pathway;
    obtaining geographic location data of the dual mode device for a plurality of access point signal strengths along a second pathway;
    obtaining geographic location data of the dual mode device for a plurality of access point signal strengths along a third pathway;

determining a circular region estimate for each of the first, second, and third pathways, the circular region estimate based on access point signal strength;

determining an intersection of the circular region estimates for the first, second, and third pathways to triangulate a geographic location of the access point; and providing triangulated geographic location data of the access point to a service provider.

18. The method of claim 17, wherein the geographic location data of the dual mode device is determined via the Global Positioning System (GPS).

19. The method of claim 17, wherein the geographic location data of the dual mode device is determined via triangulation of carrier-managed system antennae.

20. The method of claim 17, further comprising transmitting the geographic location data of the access point to a service provider via a carrier-managed system to update a database with information about the access point.

21. The method of claim 17, further comprising detecting devices associated with the access point and attributing the geographical location data of the access point to the associated devices.

* * * * *